(12) United States Patent
Denz

(10) Patent No.: US 6,691,653 B2
(45) Date of Patent: Feb. 17, 2004

(54) ELECTRONIC METHOD AND DEVICE FOR THE CONTROL OF GAS EXCHANGE VALVES OF AN INTERNAL COMBUSTION ENGINE HAVING A VARIABLE OPENING FUNCTION

(75) Inventor: Helmut Denz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 10/034,810

(22) Filed: Dec. 26, 2001

(65) Prior Publication Data

US 2002/0121267 A1 Sep. 5, 2002

(30) Foreign Application Priority Data

Dec. 22, 2000 (DE) .......................... 100 64 650

(51) Int. Cl.[7] .............................. F01L 1/34; G01M 15/00
(52) U.S. Cl. .................... 123/90.15; 73/118.1; 123/435
(58) Field of Search ........................ 123/90.1, 90.11, 123/90.12, 90.14, 90.15, 435; 73/116, 117.2, 117.3, 118.1

(56) References Cited

U.S. PATENT DOCUMENTS

| | | | | |
|---|---|---|---|---|
| 4,699,105 A | * | 10/1987 | Jensen ................... 123/406.41 |
| 4,699,107 A | * | 10/1987 | Jensen ........................ 123/435 |
| 4,995,351 A | * | 2/1991 | Ohkubo et al. .......... 123/90.11 |
| 5,024,191 A | * | 6/1991 | Nagahiro et al. ....... 123/435 X |
| 5,205,152 A | * | 4/1993 | Clarke et al. ............. 73/116 X |
| 5,623,412 A | * | 4/1997 | Masson et al. ......... 123/435 X |
| 6,055,948 A | * | 5/2000 | Shiraishi et al. ......... 123/90.15 |
| 6,073,596 A | * | 6/2000 | Kemper ................... 123/90.11 |
| 6,276,319 B2 | * | 8/2001 | Walter et al. ............ 123/90.15 |
| 6,386,179 B1 | * | 5/2002 | Hammoud et al. ..... 123/435 X |
| 6,390,040 B1 | * | 5/2002 | Hammoud et al. ...... 123/90.15 |

FOREIGN PATENT DOCUMENTS

| | | |
|---|---|---|
| DE | 195 01 386 | 8/1996 |
| WO | WO 91/08384 | 6/1991 |

* cited by examiner

Primary Examiner—Tony M. Argenbright
(74) Attorney, Agent, or Firm—Kenyon & Kenyon

(57) ABSTRACT

Method and device for controlling a valve having variable valve lift, arranged in an intake or exhaust opening of a combustion chamber of an internal combustion engine, with control of the valve taking place as a function of an analysis of a pressure in the combustion chamber.

24 Claims, 6 Drawing Sheets

ELECTRONIC METHOD AND DEVICE FOR THE CONTROL OF GAS EXCHANGE VALVES OF AN INTERNAL COMBUSTION ENGINE HAVING A VARIABLE OPENING FUNCTION

FIELD OF THE INVENTION

The present invention relates to a variable control of the gas exchange in internal combustion engines.

BACKGROUND INFORMATION

The term gas exchange describes the periodic change of the cylinder fill, i.e., the emission of exhaust gas and the intake of a fuel-air mixture. In conventional internal combustion engines, control of the gas exchange is effected via spring-loaded valves that are opened by a camshaft. The opening function as a time characteristic of the valve opening, i.e., beginning, duration and dimension of the opening cross-section, is determined by the shape of the camshaft. The opening function in conventional internal combustion engines can therefore be precisely determined by the shape of the camshaft, but is not variable. In addition, gas-exchange control systems are known that have a variable opening function. PCT Publication No. 91/08384 describes electromagnetically-controlled and hydraulically-actuated valves with a variable opening function. To eliminate the effects of tolerances and manifestations of aging in valve actuation, the valve lift is detected by a valve lift sensor, and the detected value is taken into consideration when triggering the valve. Here, the problem lies in allocating the valve lift sensor signal to the actual valve lift. For instance, the sensor signal can contain offsets that make a correct allocation difficult. To remedy this situation, the valve lift sensor described in PCT Publication No. 91/08384 is calibrated after each closing action. In the absence of a valve opening signal, the valve lift sensor signal is arbitrarily set to zero. This calibration is correct if the valve is actually closed, which is the case when actuation is intact and there is no opening signal. However, in cases where the valve does not close due to a malfunction, this calibration results in a false zero setting of the valve lift sensor.

German Published Patent Application No. 195 01 386 shows a variable valve control, where the opening function of the gas-exchange valves is determined by an opening camshaft and a closing camshaft. The opening function can be varied within a wide range by changing the phase shift between the shafts rotating at the same speed. The phase shift is changed via a linkage. With this system, a phase-angle sensor in the valve activation mechanism can detect the actual movement of the valves and/or the valve activation elements.

The problem here is that of coordinating the position of the phase-angle sensor with the position of the opening intake valves.

SUMMARY OF THE INVENTION

An object of the present invention is to improve the control of valves having variable valve lift.

This is achieved by a method for controlling a valve, having a variable valve lift, situated in an intake or exhaust opening of a combustion chamber of an internal combustion engine. With the method according to the present invention for controlling a valve having a variable valve lift, situated in an intake or exhaust opening of a combustion chamber of an internal combustion engine, the valve is controlled as a function of an analysis of a pressure in the combustion chamber. This is achieved in a particularly advantageous manner by a method for controlling a valve having a variable valve lift, situated in an intake or exhaust opening of a combustion chamber of an internal combustion engine, by providing valve lift sensor for supplying a lift signal indicating the position of the valve, with an automatic calibration of the valve lift sensor being carried out as a function of an analysis of a pressure in the combustion chamber. This makes it possible to automatically calibrate a valve lift sensor, such as a phase-angle sensor. An elaborate adjustment of the sensor (or phase angle sensor) during assembly is therefore no longer necessary. Furthermore, the automatic calibration lowers the requirements on the sensor tolerances.

The device according to the present invention for controlling a valve having a variable valve lift, situated in an intake or exhaust opening of a combustion chamber of an internal combustion engine, has a combustion chamber pressure sensor for providing a pressure signal indicating a pressure in the combustion chamber, a control device for controlling the valve lift, and an analyzer for analyzing the pressure signal.

A further device according to the present invention for controlling a valve having a variable valve lift, situated in an intake or exhaust opening of a combustion chamber of an internal combustion engine, has a valve lift sensor for providing a lift signal indicating the valve position, a combustion chamber pressure sensor for providing a pressure signal indicating a pressure in the combustion chamber, a control device for controlling the valve lift as a function of the lift signal, as well as an analyzer for analyzing the pressure signal and for calibrating the lift signal as a function of the analysis of the pressure signal.

A particular further advantage is the diagnosis of the intake valves to check for tight closing. This permits the early detection of beginning leaks such as can be caused by a valve clearance that is too small. Indication and/or storage of this error permits an early correction of the valve clearance, either through automatic intervention by the electronic valve control or by suitable maintenance measures. This can prevent expensive damage caused by burning of the valves due to insufficient heat dissipation via the valve seat.

In addition, the present invention not only permits adaptation and diagnosis of the intake-valve lift, but also of the exhaust-valve lift.

If, after an intake, the intake as well as the exhaust valves (i.e., the valves in the intake and exhaust openings) are completely closed, e.g., in coasting mode without ignition, the pressure in the combustion chamber approximately follows a steady sinusoidal course. Depending on the fill during the last intake, the pressure in the combustion chamber rises above the atmospheric pressure due to compression if the piston is in the uppermost position, and sinks below atmospheric pressure, if the piston is in the lowermost position. A deviation from this sinusoidal course, and especially a reduction of the maximum values, is advantageously interpreted as a beginning valve lift of either the intake valve or the exhaust valve. With the help of a test function, where a valve lift actuator for resetting a valve during coasting without ignition is steadily triggered from the neutral position in the direction of valve lift, an advantageous embodiment determines the zero position for the valve lift by detecting a deviation from the initial pressure characteristic.

Furthermore, in comparing the pressure curves to those of the above-mentioned test function, an incomplete sealing of the intake and/or exhaust valve can be detected. In a situation where the intake as well as the exhaust valve remain closed while the internal combustion engine keeps running (for instance during coasting without ignition), the advantages are seen as a correct closing if the pressure in the combustion chamber, as expected, again follows the aforementioned sinusoidal course with constant maximum values. If the pressure maximums, even without triggering the valve lift actuator, decrease gradually, and in a way where each maximum is smaller than the previous one, this is interpreted as a valve defect. If, on the other hand, for instance in the case of a tight intake valve which opens due to a beginning valve stroke, the pressure maximum only decreases with every other compression phase, this is advantageously interpreted as a valve opening.

DETAILED DESCRIPTION

Figure 1:
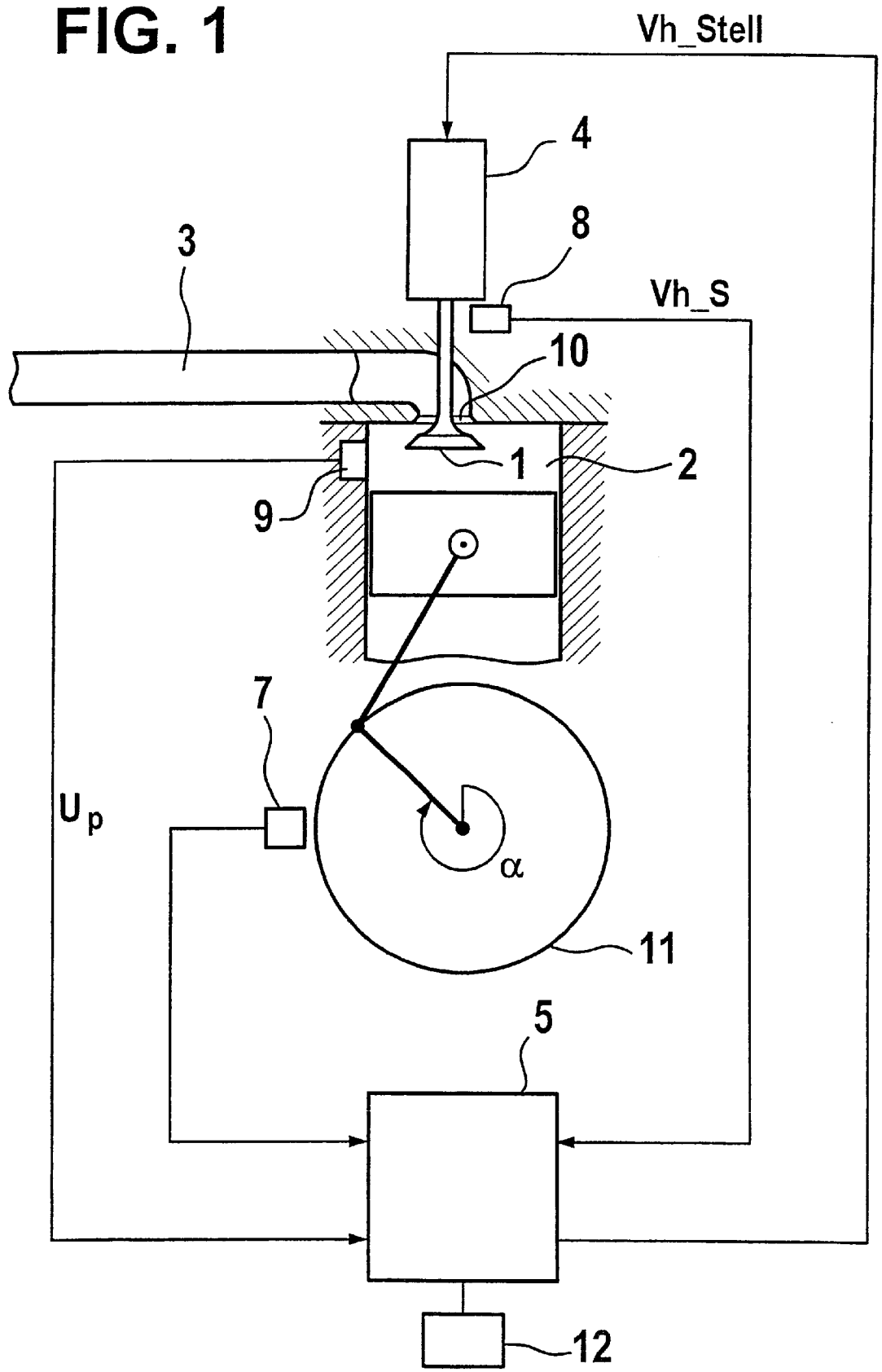
FIG. 1 shows an embodiment of the present invention using a signal from a combustion chamber pressure sensor.

Reference number 1 in FIG. 1 designates an internal combustion engine intake valve that can open or close combustion chamber 2 having intake channel 3 at intake opening 10 in a controlled way. The valve is actuated via hydraulic or electromagnetic actuator 4, for instance, which is controlled by opening signal Vh_Stell via electronic control device 5.

Control device 5 receives at least one pressure signal $U_P$ from combustion chamber pressure sensor 9, signal $\alpha$ regarding the angle position of camshaft 11 from angle sensor 7, as well as signal Vh_S from valve lift sensor 8 as input signals.

For the sake of simplicity, exhaust valve, exhaust opening and exhaust channel, through which combusted gases exit the combustion chamber, are not shown. They are situated similarly with respect to intake valve 1, intake channel 3 and intake opening 10. In some embodiments of the present invention, the electronic control device—instead of or in addition to the intake valve—can monitor or control the position of the exhaust valve in the same way as is shown here for the monitoring of the intake valve.

In an advantageous embodiment, a display which, for instance, can be implemented as error light 12 and/or as a storage medium for the display and/or documentation of a defective valve, is provided.

Figure 2:
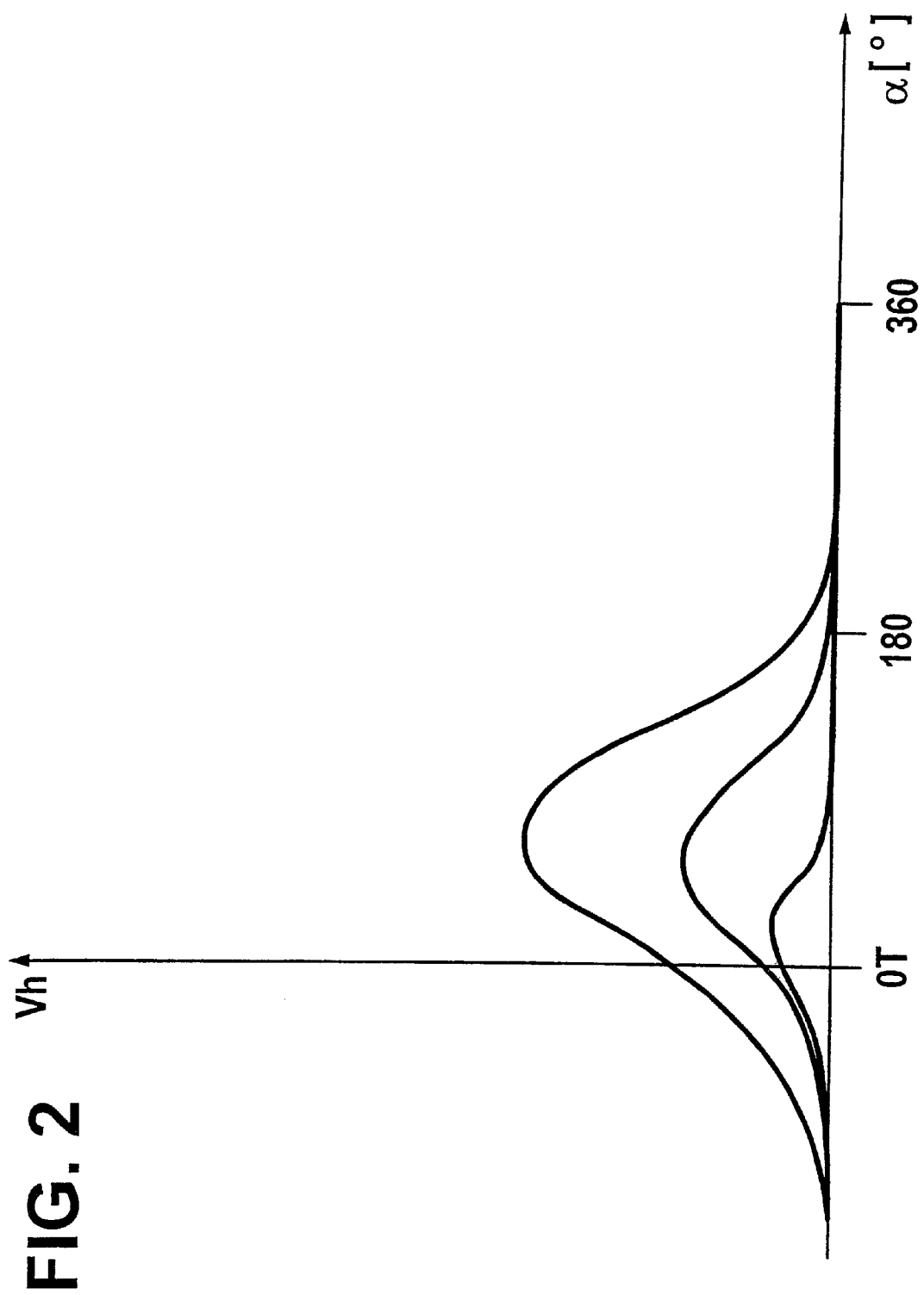
FIG. 2 shows a set of valve lift curves.

FIG. 2 shows a set of valve lift curves the way they can be adjusted by electronic control device 5 in combination with actuator 4 and sensor signals $U_P$ and Vh_S. The valve lift curve is a representation of valve lift Vh above angle of rotation $\alpha$ of the crankshaft. Especially in coasting mode, the gas exchange valves, and especially the intake valves, can remain completely closed, so that the valve lift is equal to zero.

Figure 3:
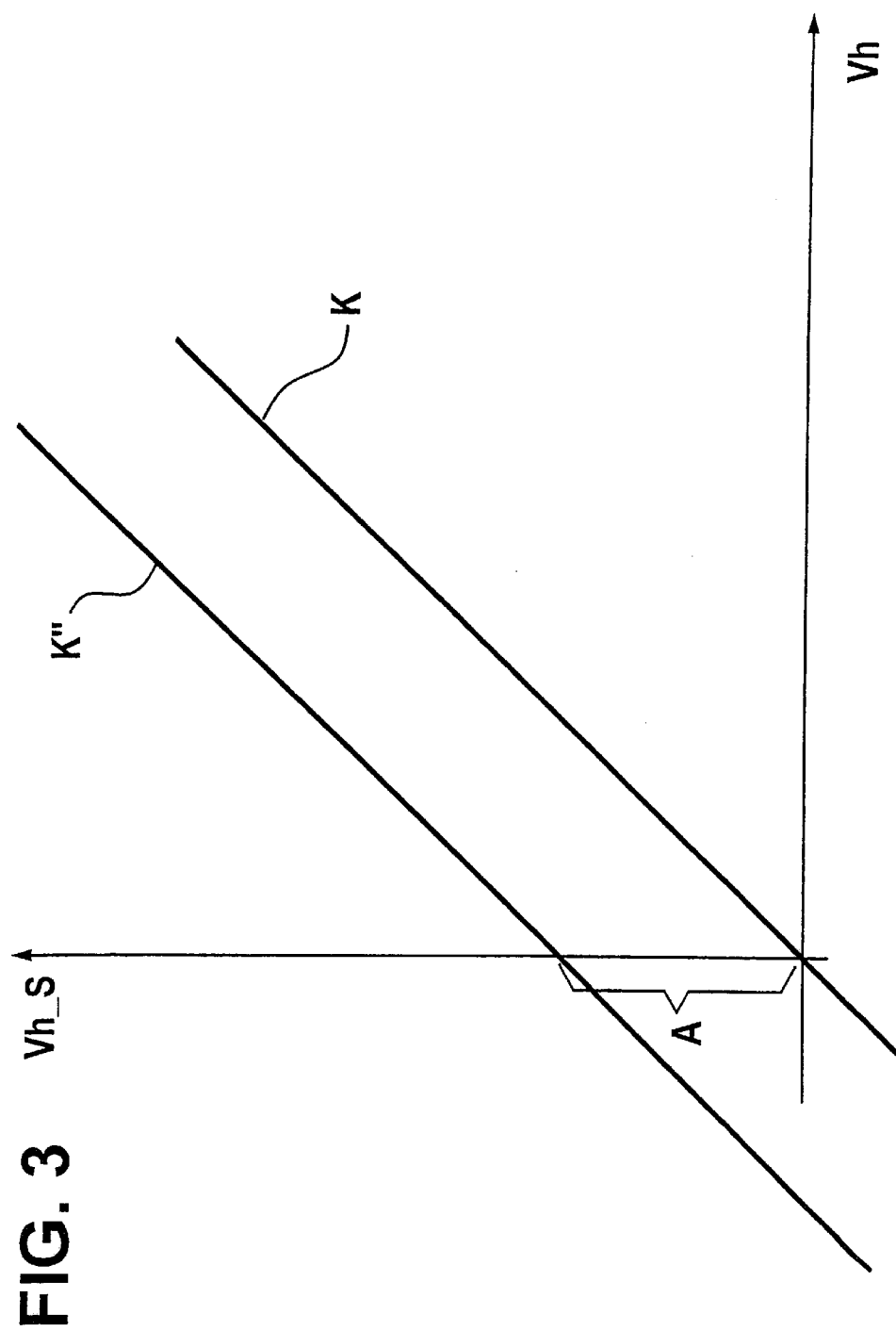
FIG. 3 shows a set of characteristic curves of a valve lift sensor.

FIG. 3 shows a set of valve lift sensor signal characteristic curves Vh_S as a function of the actual valve lift Vh, such as it can be recorded, for instance, in the case of a scattered mounting position of like sensors in series production.

Figure 4:
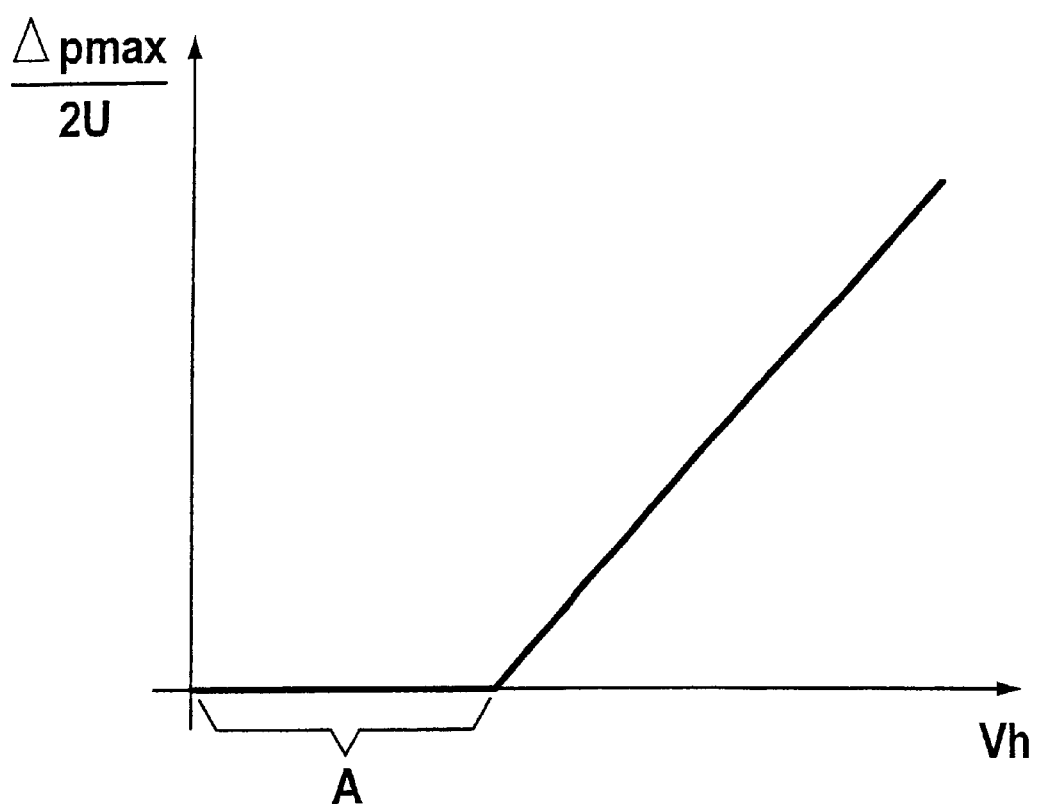
FIG. 4 shows the function of the present invention using a representation of a pressure drop gradient.

FIG. 4 shows a calibration by representing the pressure maximum decrease per two revolutions $\Delta pmax/2U$ as a function of the valve lift signal Vh_S with increasing opening signal Vh_Stell. In coasting mode, the opening signal Vh_Stell is gradually increased from zero. In the case represented here, the decrease of the pressure maximum is initially equal to zero, indicated by valve 1 remaining in the closed state in the intake opening. The rise in the valve lift signal Vh_S can occur, for instance, if valve lift sensor 8 is not directly mounted on valve 1, but on a transfer element having a mechanical play. The pressure maximum decreases only when reaching value A and thus indicates the onset of a stroke of valve 1.

Figure 5:
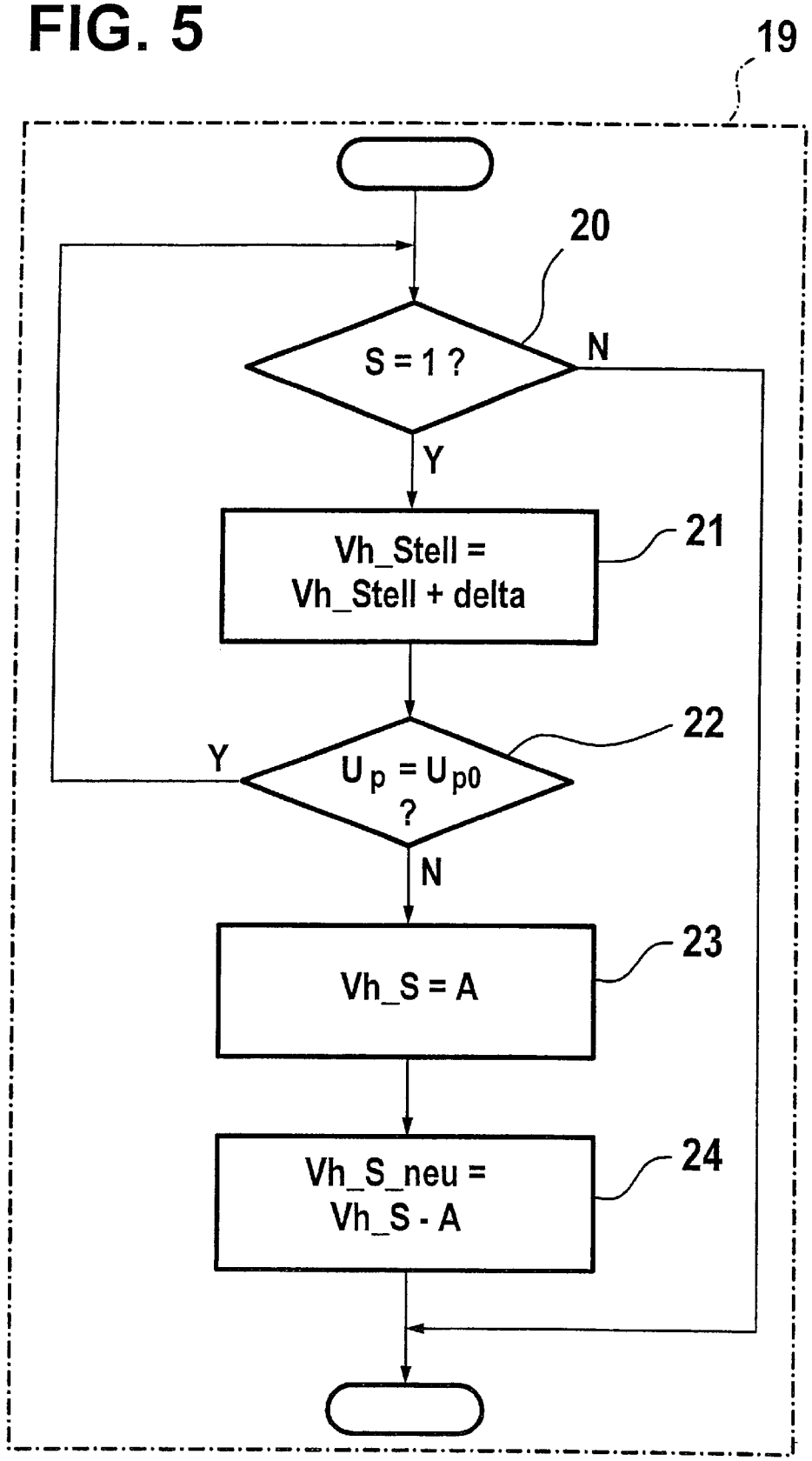
FIG. 5 shows an embodiment of an analyzer.

Value A associated with the valve lift signal is picked up by electronic control device 5 and assigned to the onset of the valve stroke as shown in detail in FIG. 5. During the subsequent control of the valve opening in normal operation of the internal combustion engine, all measured valve lifts can be related to the learned zero of the valve lift. This corresponds to a computational shift of characteristic curve K" of FIG. 3 to zero, i.e., into the position of characteristic curve K.

FIG. 5 shows analyzer 19 implemented on control device 5, with the analyzer using a signal coming from a combustion chamber pressure sensor for controlling a valve lift control system. Query 20 first checks to see if coasting mode is in effect. This is said to be the case if variable S has value 1. If coasting mode is in effect, opening signal Vh_Stell is gradually increased in each operating cycle of each cylinder by value delta (step 21.) This is followed by query 22 regarding the combustion chamber pressure signal $u_P$. As long as the combustion chamber pressure signal equals the expected curve $u_P$ of the combustion chamber pressure signal, e.g., if there is no decrease in the pressure maximum, query 22 is followed by query 20. The expected curve $u_P$ of the combustion chamber pressure signal is taken from the characteristic curve diagram in FIG. 8 and explained in more detail below. At the moment when combustion chamber pressure signal $u_P$ deviates from expected curve $u_{P0}$ of the combustion chamber pressure signal (or at that moment when it deviates from expected curve $u_{P0}$ of the combustion chamber pressure signal by more than an insignificant tolerance value,) query 22 branches to step 23, where the associated signal of the valve lift sensor Vh_S is picked up. This value is designated value A and stored. All other signals of the valve lift sensor are corrected with this stored value A, which is represented in step 24 by the equation Vh_S_neu=Vh_S-A.

The combustion chamber pressure signal $u_P$ is obtained from the voltage provided by combustion chamber pressure sensor 9. For an adequate detection of the combustion chamber pressure variation, voltage $u_P$ must be sampled at high frequency, i.e., in 0.1-ms intervals for instance.

At 6000 rpm, this results in an angular distance of 3.6° per sampled value. This permits a sufficient determination of maximum and minimum values of the combustion chamber pressure at any rotational speed.

The analysis to check for the onset of the valve lift can, for instance, be carried out in such a way that at the beginning of the coasting mode, fresh air is still drawn in, and from then on the exhaust valves are not opened again. This way, either an unburned mixture or fresh air is present in the combustion chamber of the cylinder, depending on whether or not injection took place before the last intake (see FIG. 6, reference number 60) (reference number 61.)

Figure 6:
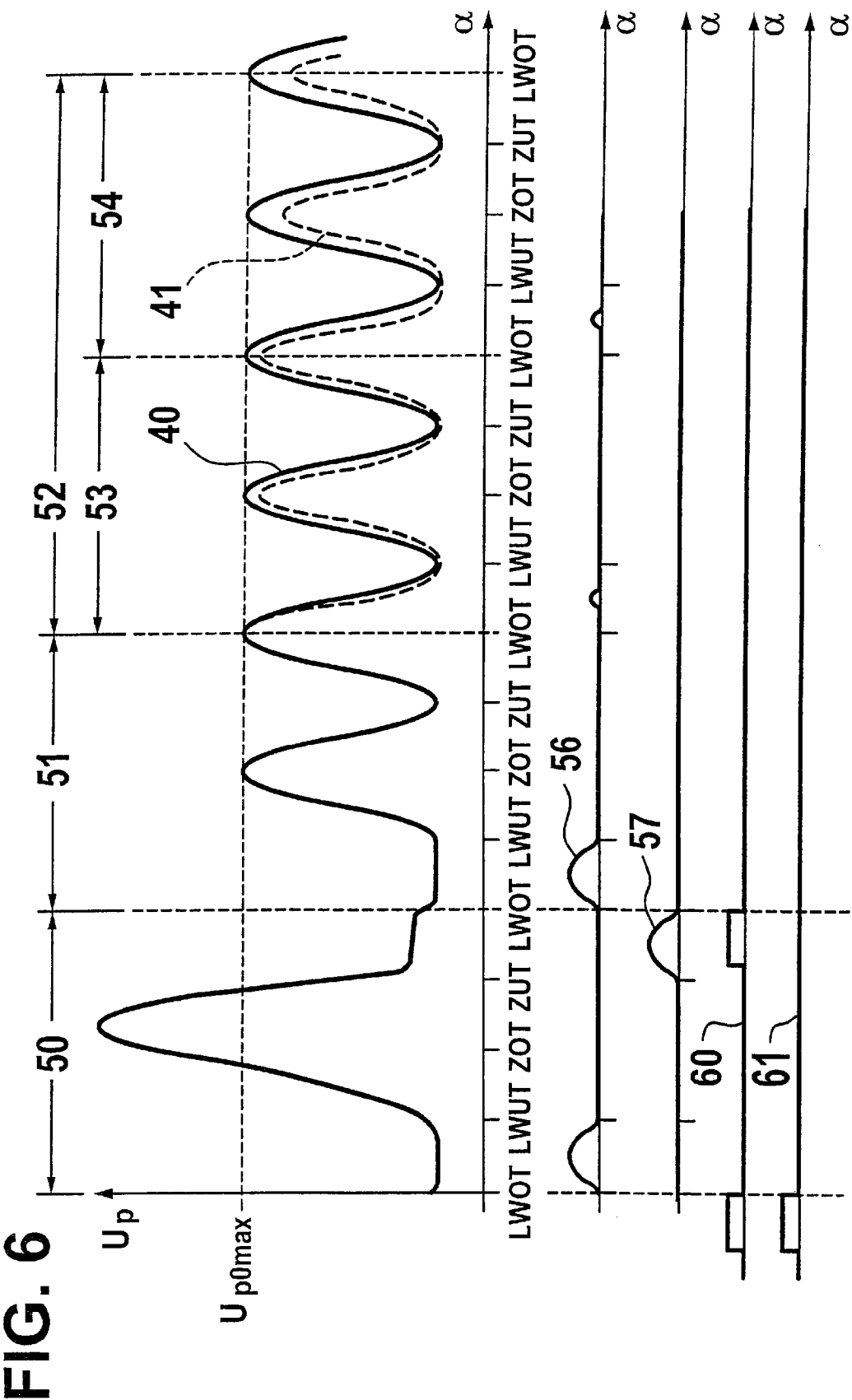
FIG. 6 shows the curve of the combustion chamber pressure when carrying out the method according to the present invention.

Completely closed intake and exhaust valves result in a pressure variation according to solid curve 40 in FIG. 6 with the maximum values $u_{p0max}$ remaining approximately the same. With each operating cycle, the valve actuator is successively triggered further and further until the case of the beginning valve lift sets in, where with every second compression stroke the pressure falls slightly compared to the preceding value, as is shown by broken line 41 in FIG. 6.

Whereas normally the intake is slightly opened with only every other compression (four-stroke engine), with purely electromagnetic or electrohydraulic control, the intake could also be slightly opened with each compression. But since only every other compression brings about a valve lift and an accompanying pressure loss, averaging can be performed via two constant pressure values, rendering the analysis of the start of the lift more precise. In addition, leaking intake or exhaust valves can be diagnosed due to the fact that in this fault scenario a pressure loss is detectable with each (and not only every other) compression.

FIG. 6 illustrates the relationship between the expected course of the combustion chamber pressure signal $u_{p0}$ and the crankshaft angle. LWUT, in FIG. 6, designates the "bottom dead center charge change," LWOT, the "top dead center charge change," and ZUT the "bottom dead center ignition."

For better understanding, the values of the combustion chamber pressure signal $u_p$ and the pressure values in the combustion chamber are represented as having the same magnitude. The signal values do not have to be equal to the pressure in the combustion chamber, only representative of it. Area 50 of the diagram contains a curve of the combustion chamber pressure with normal combustion. Area 51 shows the course where fresh air or a mixture is taken in, there is no combustion, and the exhaust does not open any longer. Solid line 40 in area 52 shows the expected course of combustion chamber pressure $u_{p0}$ for tight or completely closed valves for two operating cycles 53 and 54 of the internal combustion engine.

When the valves are closed and tight, the curve in range 52 follows a sinusoidal course with nearly constant pressure maximums when the piston is at the highest position. The pressure maximum depends on the combustion chamber fill during the last intake and the compression of the internal combustion engine. The pressure minimum is reached when the piston is at the lowest position. It is also dependent on the combustion chamber fill or the intake valve lift during the last intake, and it is less than the ambient pressure. Should successive triggering of the actuator (possibly after several coastings) have resulted in a beginning valve lift, for which a pressure loss is detectable after every other compression as shown by broken line 41, while curve 56 reflects the position of the intake valve, and curve 57, the position of the exhaust valve. The test can be performed in the same way for the intake and exhaust valves.

Curve 61 of the injection pulses (bottom of FIG. 6) shows a case where injection no longer takes place during the last intake in range 51. In this case, during the lift test with pressure loss, only fresh air leaks into the intake (intake actuator adjustment) or exhaust (exhaust actuator adjustment). Upon resumption, however, one must wait for another operating cycle, worsening the spontaneity upon resumption. Therefore, another method is advantageous, where—as in curve 60—injection, but no ignition, takes place before the last intake in range 51. This puts a combustible mixture in the cylinders and, upon resumption, ignition can take place without additional exhaust, resulting in a very spontaneous gas intake.

The mixture escaping during actuator adjustment is not disruptive since only a small amount escapes from the cylinder and is converted in the catalytic converter in the case of the exhaust adjustment, therefore not representing a significant emission increase, and in the case of the intake adjustment, it flows back into the intake pipe where it is drawn in again during the first operating cycle after the end of coasting.

When a valve at the intake or exhaust opening does not close tightly, there is a steady pressure loss with each compression, even without any triggering of the valve actuators. Furthermore, the stepped pressure loss occurring with every other compression can be differentiated from the steady pressure loss during each compression in the fault scenario of a constantly leaking valve.

Another method may involve analyzing the pressure amplitudes, i.e., the difference between maximum and minimum, instead of the pressure maximums.

Instead of the pressure maximum or the pressure amplitude analysis described here, there are other conceivable methods such as a symmetrical analysis of maximums and minimums around the ambient pressure for the event that the intake valve is only briefly opened after the exhaust in the area.

What is claimed is:

1. A method of controlling a valve having a variable valve lift, situated in one of an intake opening and an exhaust opening of a combustion chamber of an internal combustion engine, comprising the steps of:

performing an analysis of a pressure in the combustion chamber;

controlling the valve as a function of the analysis;

providing a valve lift sensor for providing a lift signal indicating a position of the valve; and performing an automatic calibration of the valve lift sensor in accordance with the analysis.

2. The method according to claim 1, further comprising the step of:

performing a diagnostic function in accordance with the analysis.

3. The method according to claim 1, further comprising the step of:

outputting the analysis as customer service information.

4. A method of controlling a valve having a variable valve lift, situated in one of an intake opening and an exhaust opening of a combustion chamber of an internal combustion engine, comprising the steps of:

performing an analysis of a pressure in the combustion chamber; and controlling the valve as a function of the analysis;

wherein the analysis takes place during a coasting without ignition, with all valves in intake openings and exhaust openings of the combustion chamber being closed, with a defined fill into the combustion chamber being initiated during a last preceding intake.

5. The method according to claim 4, wherein:

the analysis during the coasting without ignition is performed by triggering the valve from a neutral position in a direction of an increased valve lift.

6. The method according to claim 4, further comprising the step of:

performing the analysis by comparing a mean value of at least two successive pressure maximums of an operating cycle of the internal combustion engine with mean values of pressure maximums of at least one subsequent operating cycle of the internal combustion engine.

7. A method of controlling a valve having a variable valve lift, situated in one of an intake opening and an exhaust opening of a combustion chamber of an internal combustion engine, comprising the steps of:

performing an analysis of a pressure in the combustion chamber;

controlling the valve as a function of the analysis;

modifying the pressure in the combustion chamber; and performing the analysis by comparing at least two successive pressure maximums of the pressure in the combustion chamber with one another.

8. A method of controlling a valve having a variable valve lift, situated in one of an intake opening and an exhaust opening of a combustion chamber of an internal combustion engine, comprising the steps of:

performing an analysis of a pressure in the combustion chamber;

controlling the valve as a function of the analysis; and analyzing a difference between a pressure maximum and a pressure minimum of the pressure in the combustion chamber.

9. A method of controlling a valve having a variable valve lift, situated in one of an intake opening and an exhaust opening of a combustion chamber of an internal combustion engine, comprising the steps of:

performing an analysis of a pressure in the combustion chamber;

controlling the valve as a function of the analysis; and determining in accordance with the analysis a zero point of a lift signal provided by a valve lift sensor such that a zero point of a lift of the valve corresponds to a beginning of a valve stroke.

10. A method of controlling a valve having a variable valve lift, situated in one of an intake opening and an exhaust opening of a combustion chamber of an internal combustion engine, comprising the steps of:

performing an analysis of a pressure in the combustion chamber;

controlling the valve as a function of the analysis; and detecting in accordance with the analysis the valve at one of the intake opening and the exhaust opening not closing tightly.

11. A method of controlling a valve having a variable valve lift, situated in one of an intake opening and an exhaust opening of a combustion chamber of an internal combustion engine, comprising the steps of:

performing an analysis of a pressure in the combustion chamber; and controlling the valve as a function of the analysis;

wherein the analysis is performed by comparing the pressure in the combustion chamber with an expected course of the pressure in the combustion chamber over time.

12. A device for controlling a valve having a variable valve lift and arranged in one of an intake opening and an exhaust opening of a combustion chamber of an internal combustion engine, comprising:

a valve lift sensor for providing a lift signal indicating a valve position;

a combustion chamber pressure sensor for providing a pressure signal indicating a pressure in the combustion chamber; and a control device for controlling the variable valve lift as a function of the lift signal, the control device including:

an analyzer for analyzing the pressure signal and for calibrating the lift signal as a function of the analysis of the pressure signal.

13. The method according to claims 4, 7, 8, 9, 10 or 11, further comprising the steps of:

providing a valve lift sensor for providing a lift signal indicating a position of the valve; and performing an automatic calibration of the valve lift sensor in accordance with the analysis.

14. The method according to claims 4, 7, 8, 9, 10 or 11, further comprising the step of:

performing a diagnostic function in accordance with the analysis.

15. The method according to claims 4, 7, 8, 9, 10 or 11, further comprising the step of:

outputting the analysis as customer service information.

16. The method according to claim 15, further comprising the step of:

outputting the analysis as customer service information.

17. The method according to claims 1, 7, 8, 9, 10 or 11, wherein:

the analysis takes place during a coasting without ignition, with all valves in intake openings and exhaust openings of the combustion chamber being closed, with a defined fill into the combustion chamber being initiated during a last preceding intake.

18. The method according to claim 17, wherein:

the analysis during the coasting without ignition is performed by triggering the valve from a neutral position in a direction of an increased valve lift.

19. The method according to claims 1, 4, 8, 9, 10 or 11, further comprising the steps of:

modifying the pressure in the combustion chamber; and performing the analysis by comparing at least two successive pressure maximums of the pressure in the combustion chamber with one another.

20. The method according to claim 19, further comprising the step of:

performing the analysis by comparing a mean value of at least two successive pressure maximums of an operating cycle of the internal combustion engine with mean values of pressure maximums of at least one subsequent operating cycle of the internal combustion engine.

21. The method according to claims 1, 4, 7, 9, 10 or 11, further comprising the step of:

analyzing a difference between a pressure maximum and a pressure minimum of the pressure in the combustion chamber.

22. The method according to claims 1, 4, 7, 8, 10 or 11, further comprising the step of:

determining in accordance with the analysis a zero point of a lift signal provided by a valve lift sensor such that a zero point of a lift of the valve corresponds to a beginning of a valve stroke.

23. The method according to claims 1, 4, 7, 8, 9 or 11, further comprising the step of:

detecting in accordance with the analysis the valve at one of the intake opening and the exhaust opening not closing tightly.

24. The method according to claims 1, 4, 7, 8, 9 or 10, wherein:

the analysis is performed by comparing the pressure in the combustion chamber with an expected course of the pressure in the combustion chamber over time.

* * * * *